United States Patent [19]

Accattino

[11] 4,342,909
[45] Aug. 3, 1982

[54] OPTICAL TRANSDUCER FOR DETECTING THE ANGULAR POSITION OF A ROTATING MEMBER WITH RESPECT TO A FIXED STRUCTURE

[75] Inventor: Andrea Accattino, Salerano, Italy
[73] Assignee: Ing. C. Olivetti & C., S.p.A., Italy
[21] Appl. No.: 140,146
[22] Filed: Apr. 14, 1980
[30] Foreign Application Priority Data
  Sep. 27, 1979 [IT] Italy ................. 68875 A/79
[51] Int. Cl.³ .............................................. G01D 5/34
[52] U.S. Cl. ............................................ 250/231 SE
[58] Field of Search ............... 250/231 SE, 237 G; 356/395; 324/175; 340/347 P

[56] References Cited
U.S. PATENT DOCUMENTS
  4,268,747  5/1981  Becchi et al. ............. 250/231 SE Primary Examiner—David C. Nelms
Assistant Examiner—Darwin R. Hostetter
Attorney, Agent, or Firm—Edward F. McKie, Jr.

[57] ABSTRACT

An optical transducer for detecting the angular position of a rotating member with respect to a fixed structure comprises a shell formed by two half shell portions which are assembled together by positioning projections which are provided integrally on one of the two half shell portions and which can be precisely connected to corresponding openings provided in the other of the two half shell portions. Arranged within the shell, with play, are a disc which is provided with radial openings, a hub having a plate portion for fixing the disc, a single light emitting means and a plurality of photovoltaic cells for detecting the passage of light through the openings in the disc. Two fixed masks provided with openings are interposed, one between the light emitting means and the disc and the other between the disc and the photovoltaic detection cells. The openings in the masks are aligned with the light emitting means and the detection cells in such a way as to collect the light into parallel beams substantially perpendicular to the disc. The shell has a central hole for housing the hub with play and a circular opening for housing with play the plate portion fixed to the disc. The hole and the opening in the shell provide a tortuous path which prevents the outside light from passing into the interior of the transducer.

10 Claims, 3 Drawing Figures

OPTICAL TRANSDUCER FOR DETECTING THE ANGULAR POSITION OF A ROTATING MEMBER WITH RESPECT TO A FIXED STRUCTURE

BACKGROUND OF THE INVENTION

The present invention relates to an optical transducer for detecting the angular position of a rotating member, with respect to a fixed structure. A use of this arrangement, which is given by way of example and without limitation, is in relation to the shaft of a motor which provides for selection of the character of a character-carrying member of an office printing machine or movement of the character-carrying member with respect to a line of print.

The optical transducer according to the present invention comprises a disc which is connected to the rotating member and which is provided with a plurality of radial openings, a light emitting means and means for detecting the passage of the light through the openings of the disc.

A transducer is known, wherein the light generated by a first emitting means is divided into a plurality of light beams by a fixed mask which is arranged between the light emitting means and the apertured disc, and on which a second series of openings is provided. The light detecting means comprise a plurality of phototransistors, each of which co-operates with one of the light beams produced by the mask, to generate cyclic electrical signals which are out-of-phase with each other and which, when suitably processed, are indicative of the angular position of the rotating member and the direction of rotation thereof. A second light emitting means co-operates with a synchronisation opening of the disc and with a corresponding light detecting means for determining a reference or zero position of the rotating member. In this transducer, the light from the first light emitting means is divided by the mask and produces light beams which are slightly divergent relative to each other, whereby any axial movement of the disc with respect to the fixed mask causes a variation in the amount of light which passes through the openings in the disc and which reaches the detecting means, which in consequence can generate signals which are distorted and out of phase with respect to the true position of the rotating member.

SUMMARY OF THE INVENTION

A first object of the present invention is to provide an optical transducer which is highly reliable and inexpensive and in which any axial movements of the rotating member and the disc connected thereto do not have a negative influence on determining the angular position thereof.

In accordance with this object, the optical transducer according to the invention is characterised in that two fixed masks provided with openings are interposed, one between the light emitting means and the disc and the other between the disc and the detecting means, and that the openings are aligned with said light emitting means and with said detecting means in such a way as to collect the light into parallel beams which are substantially perpendicular to said disc.

A second object of the present invention is to provide an optical transducer which is of low cost and small dimensions and which is easy to mount on the structure of the rotating member, and which at the same time is substantially insensitive to the assembly conditions and to the conditions in respect of ambient illumination. In accordance with this object, the transducer according to the invention comprises a disc provided with a plurality of openings, a hub which can be connected to the rotating member and which is provided with a plate portion for fixing the disc, a light emitting means, means for detecting the passage of the light through the openings in the disc and a shell which carries the light emitting means and the detecting means, and is characterised in that the shell comprises two half shell portions which are assembled together by means of a plurality of positioning projections which are provided integrally on one of the two half shells and which can be connected precisely to corresponding openings provided in the other of the two half shell portions, and that one of the two half shell portions is so formed as to have a central through hole capable of housing with play the hub of the disc and a circular opening capable of housing with play the plate portion of the hub.

A third object of the present invention is to provide a transducer which can be easily positioned with respect to the fixed structure with respect to which the rotating member rotates, and which at the same time permits a wide tolerance between parts in movement and fixed parts.

In accordance with this third object, the transducer according to the invention comprises a disc which is connected to the rotating member and which is provided with a plurality of radial openings, a hub which is fixed to the disc for holding it in a plane which is substantially perpendicular to the axis of the rotating member, a detector for detecting the angular position of the disc and a shell for carrying the detector, and is characterised in that the shell has a central through hole which is coaxial with the axis of the rotating member for receiving the hub with ample play, and an opening which is perpendicular to the axis of the rotating member for housing the disc with ample play, first positioning means are provided for axially positioning the disc with respect to the rotating member, second positioning means are provided for centering the through hole with respect to the hub and third positioning means are provided for positioning the shell at a predetermined distance from a fixed structure along the axis of the rotating member.

DESCRIPTION OF THE DRAWING

These and other features of the invention will be more clearly apparent from the following description of a preferred embodiment which is given by way of example and without limitation, with reference to the accompanying drawings wherein.

DESCRIPTION OF THE ILLUSTRATED EMBODIMENT

Figure 1:
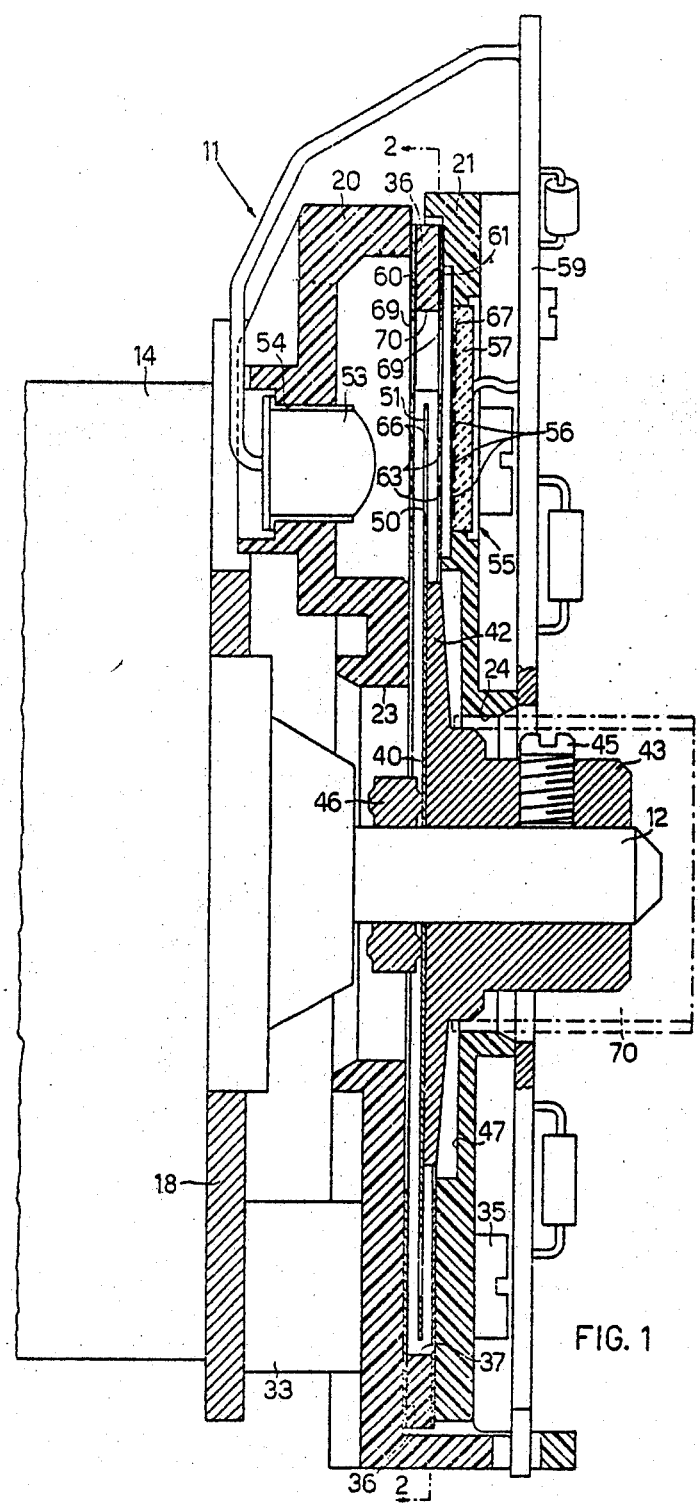
FIG. 1 is a sectional side view of the transducer according to the invention.
Figure 2:
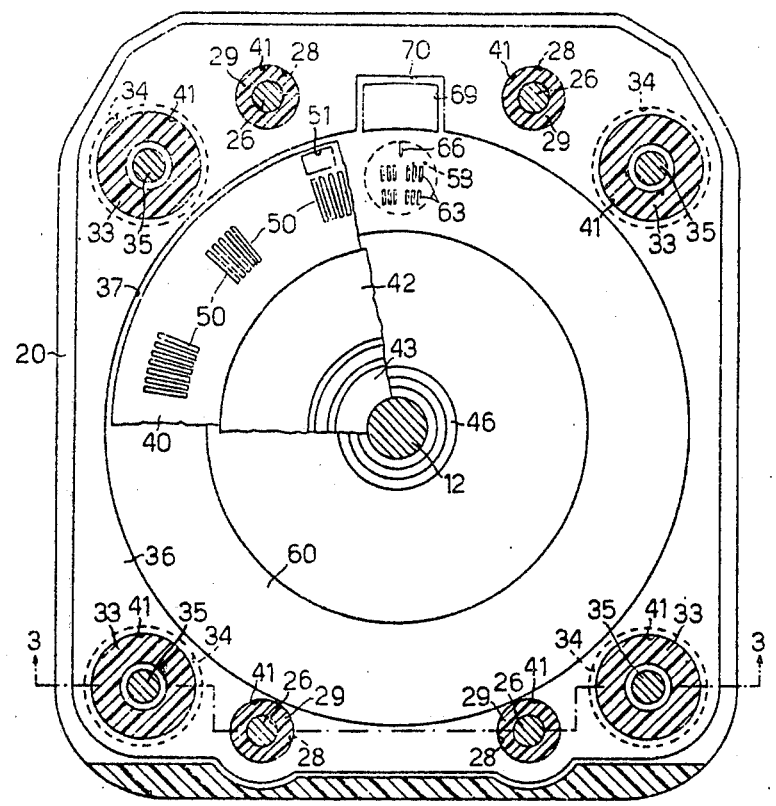
FIG. 2 is a view in section taken along line 2—2 in FIG. 1.
Figure 3:
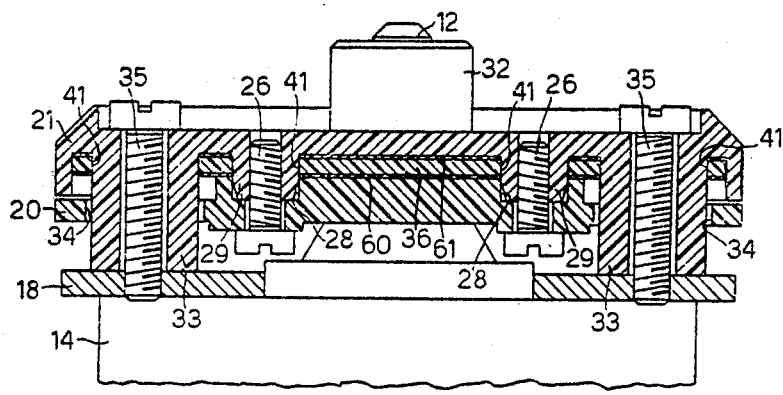
FIG. 3 is a view in section taken along line 3—3 in FIG. 2.

Referring to FIG. 1, the transducer according to the invention, which is generally indicated by reference numeral II, is used in relation to a shaft 12 of a motor 14 and comprises a shell which is of plastics material and which is of substantially parallelepiped shape and which is formed by two half shell portions 20 and 21 which are respectively disposed adjacent the motor 14 and the free end of the shaft 12. The two half shell portions 20 and 21 have a central hole 23 and 24 respectively for the shaft 12 to pass therethrough and are secured together by means of four screws 26 (see FIGS. 2 and 3).

Four cylindrical openings 28 which are coaxial with respect to the screws 26 are provided in the half shell portion 20 and four corresponding cylindrical stud portions 29 or positioning projections are provided in the half shell portion 21 and are capable of being precisely connected to the openings 28 for correctly assembling the two half shell portions 20 and 21.

The half shell portions 21 has four stud portions 33 which project outwardly of the half shell portion 20 through four through holes 34. The shanks of four screws 35 are received with clearance within the four stud portions 34, the transducer 11 being fixed to the flange 18 of the motor 14 by means of the four screws 35.

Disposed between the two half shell portions 20 and 21 is a spacer member 36 which has a central cylindrical hole 37 within which a synchronisation disc 40 is housed with clearance, and eight through holes 41 through which pass the stud portions 29 and 33.

The disc 40 is 38 mm in diameter and is fixed to a plate portion 42 of a hub 43 which is locked, for example by means of a screw 45, to the shaft 12 (see FIG. 1).

The half shell portion 21 is so shaped that, besides the hole 24 in which the hub 43 is housed with clearance, the half shell portion also has an opening 47 in which the plate portion 42 is housed, also with play.

The disc 40 is provided with a plurality of radially extending position openings 50 (see FIGS. 1 and 2) at a constant pitch, which comprise substantially rectangular apertures, each of which has a transverse width which is slightly less than half the pitch and extends radially for about 2.5 mm while the inside edge is spaced at about 3 mm from the edge of the plate portion 42.

In addition, outwardly of the openings 50, the disc 40 is provided with a single synchronisation opening 51 which is wider than the openings 50, with the edges being out-of-phase with respect to the edges of the openings 50. Either the openings 50 or the opening 51 may be produced with very close tolerances in respect of pitch and transverse dimensions, by means of a photogravure process in any known manner.

A single light emitting means 53 which comprises for example a photodiode is arranged in a housing 54 in the half shell portion 20, being disposed in association with the ring of openings 50 and 51 in the disc 40.

Disposed opposite the light emitting means 53 and carried by the half shell portion 21 is a light detecting means 55 which comprises for example a plurality of photovoltaic cells 56 mounted on a small plate member 57.

The photodiode 53 and the cells 56 are electrically connected to the plate member of a printed circuit 59 which is mounted externally of the half shell portion 21. The printed circuit 59 processes the output signals of the cells 56 in any known manner.

Two masks or screens 60 and 61 are provided, one being disposed between the half shell portion 20 and the member 36 and the other between the member 36 and the half shell portion 21. The masks 60 and 61 are provided with a plurality of openings 63 in association with the ring of openings 50 in the disc 40, and a single opening 66 associated with the synchronisation opening 51. The openings 63 and 66 divide the light emitted by the photodiode 53 to collect it into parallel beams towards the cells 56 which are very close to the mask 61.

A photovoltaic cell 67 which is mounted on the plate member 56 and which is also connected to the printed circuit 59 is disposed outwardly of the periphery of the disc 40 and receives part of the light from the photodiode 53 by way of apertures 69 and 70 in the masks 60 and 61 and the member 36 respectively. The voltage of the cell 67 is not influenced by the rotary movement of the disc and is used to keep the light flux of the photodiode constant, in any known manner which is not described herein.

Assembly of the transducer 11 according to the invention is as follows:

The mask 61 and the spacer member 36 are arranged within the half shell portion 21 (FIG. 3), fitting them on to the stud portions 29 and 33. The hub 43 is then introduced into the hole 24 in the half shell portion 21, whereby the disc 40 which has previously been secured to the flange 42 is housed in the central hole 37 in the member 36. The mask 60 is inserted on to the stud portions 29 and 33 and the half shell portion 20 is fitted on to the half shell portion 21, with the stud portions 29 being received in the openings 28. The two half shell portions 20 and 21 are then secured together by the four screws 26.

After having been assembled in this way, the transducer is then fitted to the shaft 12 of the motor 14.

As a preliminary step, the locking disc 46 is fixed in place on the shaft 12 at a predetermined distance from the flange 18. The shaft 12 is inserted into the hub 43 so that the half shell portion 20 comes to lie adjacent the flange 18, until the disc 40 comes into abutment against the disc 46.

The assembled half shell portions 20 and 21 are centered with respect to the shaft 12 and consequently with respect to the synchronisation disc 40, before the half shell portions are secured to the flange 18. In order to provide for this centering operation, a socket member 70 shown in outline in FIG. 1 is interposed between the hub 43 and the half shell portion 21. In this way the half shell portions 20 and 21 and the other components joined thereto are centered coaxially with respect to the shaft 12.

After the transducer has been secured to the flange 18, the socket member 70 is removed. The hub 43 is then locked on the shaft 12 by means of the screw 45. In this way the disc 40 is positioned with respect to the shaft 12 and the flange 18 of the motor 14. The mode of operation of the transducer 11 according to the invention is of conventional kind and is not described herein, for the sake of brevity.

It will be clearly seen from the foregoing description that, with the disc 40 interposed with play between the two masks 60 and 61, any axial movements of the shaft 12 and the disc 40 connected thereto do not have a negative influence on determining their position and angular speed.

It will also be clearly seen that the connection between the half shell portions 20 and 21 is made by means of the positioning projections 29 which are provided integrally on the half shell portion 21 and which can be precisely connected to the corresponding openings 28 provided in the other half shell portion 20, and that the half shell portion 21 is so shaped as to provide a central through hole 24 for receiving the hub 43 of the disc 40 with play, and a circular opening 47 for receiving the plate portion 42 of the hub 43, with play. In this way, the connection between the rotating members 40, 42 and 43 and the half shell portion 21, while permitting free rotation of the rotary members with respect to the half shell portion 21, forms a tortuous path between the outside environments and the opening 37, which prevents the outside light from penetrating to the interior of the transducer itself. This arrangement therefore provides that the light detecting means 56 and 57 are not influenced by the ambient lighting conditions. Finally, it will be clearly seen that, for positioning the transducer according to the invention with respect to the fixed structure with respect to which the rotary member 12 rotates, first positioning means comprising the disc 46 are provided for axially positioning the disc 40 with respect to the shaft 12, second positioning means comprising the socket member 70 are provided for centering the through hole 24 with respect to the hub 43, and third positioning means comprising the stud portions 33 and the flange 18 are provided for positioning the shell at a predetermined distance from the fixed structure along the axis of the rotating member.

It will be apparent that modification may be made to the above-described transducer without thereby departing from the scope of the present invention.

I claim:

1. An optical transducer for detecting the angular position of a rotating member with respect to a fixed structure, comprising a disc which is connected to said rotating member and which is provided with a plurality of radial openings disposed along an anular region of said disc and having a fixed angular dimension and pitch, light emitting means and detecting means for detecting the passage of the light through said radial openings, a first fixed mask interposed between said emitting means and said disc and a second fixed mask interposed between said disc and said detecting means, wherein said first and second masks comprise a plurality of adjacent openings having a predetermined angle dimension and pitch associated with the angular dimension and pitch of the radial openings of the disc, wherein each opening of the first mask is aligned with an associated opening of the second mask and wherein the openings of the first mask and the associated openings of the second mask are aligned with said emitting means and with said detecting means thereby to collect the light into a plurality of parallel beams which crosses a section of the annular region of the disc and wherein the beams are substantially perpendicular to said disc.

2. An optical transducer for detecting the angular position of a rotating member with respect to a fixed structure, comprising:
a substantially closed shell having means defining a central hole for lodging said rotating member and a transverse cavity which perpendicularly crosses said central hole;
a disc lodged with ample clearance inside said transverse cavity and connected to said rotating member for rotating therewith;
means for holding said disc in a plane substantially perpendicular to the axis of said rotating member;
means defining on said disc a plurality of equally spaced radially extending transparent regions separated by opaque regions, each one of said regions having a predetermined angular width;
light emitting means and light detecting means mounted inside said shell for detecting the passage of said transparent regions and generating corresponding electrical signals; and
means for collecting the light emitted by said light emitting means into a plurality of parallel beams substantially perpendicular to said disc and having each one a width substantially equal to the angular width of said regions, said collecting means comprising a first mask interposed between said light emitting means and said disc, and a second mask interposed between said disc and said light detecting means, each one of said two masks being provided with a plurality of slots extending radially with respect to said rotating member, said slots being equal in width and spacing to the transparent regions of said disc and aligned with said light emitting means and said detecting means.

3. A transducer according to claim 2, wherein a spacer is mounted inside said shell, interposed between said two masks and has a circular opening which defines said transverse cavity, in which said disc is housed with ample clearance.

4. A transducer according to claim 2, wherein a single synchronisation element is provided in said disc in a space between said light-transmitting elements and the periphery of said disc.

5. An optical transducer for detecting the angular position of a rotating member with respect to a fixed structure, comprising a disc having a plurality of radial light-transmitting elements, a hub connected to said rotating member and having a plate portion for fixing said disc, light emitting means, means for detecting the passage of the light emitted by said light emitting means through said plurality of radial light-transmitting elements, a shell for supporting said light emitting means and said detecting means and for lodging said disc, said shell comprising a first and a second half shell portion and means for removably and precisely assembling together said first and second half shell portion, said assembling means comprising a plurality of positioning projections which are provided integrally on said first half shell portion, a plurality of corresponding openings provided in said second half shell portion precisely coupled with said projections, and a plurality of screw elements screwable between said second half shell portion and said positioning projections, said first half shell portion having means defining a central through hold for housing said hub with clearance and a circular opening for housing said plate portion and said disc with clearance.

6. A transducer according to claim 5, wherein said first half shell portion further comprises a plurality of stud portions to be fixed to said fixed structure and wherein said second half shell portion further comprises a plurality of corresponding holes for lodging said stud portions.

7. A transducer according to claim 5, wherein said disc has a circular region disposed in proximity of the outside diameter of the plate portion of said hub, and wherein said radial light-transmitting elements are disposed radially along said circular region.

8. An optical transducer for detecting the angular position of a rotating member with respect to a fixed structure, comprising a disc connected to said rotating member and provided with a plurality of radial light transmitting elements, a hub fixed to said disc for holding said disc in a plane substantially perpendicular to the axis of said rotating member, a light emitter and a detector cooperating with said light transmitting elements for detecting the angular position of said disc, a shell for supporting said light emitter and said detector, said shell comprising means defining a central through hole coaxial with respect to the axis of said rotating member for housing said hub with ample clearance and a transverse cavity perpendicular to the axis of said rotating member for housing said disc with ample clearance, means for axially positioning said disc with respect to said rotating member, said axial positioning means comprising a stop member which is fitted on said rotating member at a predetermined distance from said fixed structure and against which said disc bears, means for centering said through hole with respect to said hub, said centering means comprising a removable socket member interposed between said hub and said means defining said central through hole, and means for mounting said shell on said fixed structure, said mounting means comprising a plurality of studs provided on said shell and having external reference surfaces parallel to said transverse cavity and disposed at said predetermined distance therefrom for being mounted against said fixed structure.

9. An optical transducer for detecting the angular position of a rotating member with respect to a fixed structure, comprising:
    a substantially closed shell constituted by a first and a second half shell portion assembled together and having a central hole for lodging with ample clearance said rotating member;
    a spacer mounted between said two half shell portions and having a circular cavity substantially perpendicular to said central hole;
    a disc lodged with ample clearance inside said circular cavity and connected to said rotating member for rotating therewith;
    means for holding said disc in a plane substantially perpendicular to the axis of said rotating member;
    means defining on said disc a plurality of equally radially extending transparent regions separated by opaque regions, each one of said regions having a predetermined angular width;
    an illuminator and a light detector mounted each one in a corresponding one of said two half shell portions, in front of said transparent and opaque regions, at opposite sides with respect to said disc; and
    means for collecting the light emitted by said illuminator into a plurality of parallel beams substantially perpendicular to said disc and having each one a width substantially equal to the angular width of said regions, said collecting means comprising a first mask interposed between said spacer and said first half shell portion and a second mask interposed between said spacer and said second half shell portions, each one of said two masks being provided with a plurality of transparent elements separated by opaque elements extending radially with respect to said rotating member, said transparent elements being equal in width and spacing to the transparent regions of said disc and aligned with said illuminator and with said light detector.

10. An optical transducer for detecting the angular position of a rotating member with respect to a fixed structure, comprising:
    a substantially closed shell constituted by a first half shell portion, a second half shell portion and means for removably and precisely assembling together said two half shell portions, said assembling means comprising a plurality of positioning projections provided integrally on said first half shell portion, a plurality of corresponding openings provided in said second half shell portion for being precisely coupled with said projections, and a plurality of screw elements screwable between said second half shell portion and said positioning projections, said shell having means defining a central hole for lodging with ample clearance said rotating member;
    a spacer mounted between said two half shell portions and having a circular cavity substantially perpendicular to said central hole;
    a disc lodged with ample clearance inside said circular cavity and connected to said rotating member for rotating therewith;
    means defining on said disc a plurality of equally radially extending transparent regions separated by opaque regions, each one of said regions having a predetermined angular width;
    means for holding said disc in a plane substantially perpendicular to the axis of said rotating member, said holding means comprising a hub mounted to said rotating member and having a plate portion for fixing said disc;
    a light emitter and a light detector mounted inside said shell in front of said transparent and opaque regions at opposite sides with respect to said disc; and
    means for collecting the light emitted by said light emitter into a plurality of parallel beams substantially perpendicular to said disc and having each one a width substantially equal to the angular width of said regions, said collecting means comprising a first mask interposed between said spacer and said first half shell portion and a second mask interposed between said spacer and said second half shell portion, each one of said two masks being provided with transparent elements separated by opaque elements extending radially with respect to said rotating member, said transparent elements being equal in width and spacing to the transparent regions of said disc and aligned with said light emitter, said light detector and with said transparent and opaque regions of said disc.

* * * * *